United States Patent [19]

Chan et al.

[11] Patent Number: 5,065,053

[45] Date of Patent: Nov. 12, 1991

[54] EXPONENTIAL FUNCTION CIRCUITRY

[75] Inventors: Ivan T. Chan, Kanata; Russell W. Brown, Nepean, both of Canada

[73] Assignee: Digital Equipment Corporation of Canada, Ltd., Kanata, Canada

[21] Appl. No.: 485,059

[22] Filed: Feb. 26, 1990

[51] Int. Cl.[5] .......................... G06F 7/556; G06G 7/12

[52] U.S. Cl. .......................... 307/492; 328/145; 328/160; 307/494

[58] Field of Search .......................... 307/494, 261, 492; 328/142, 144, 145, 160; 330/141, 281

[56] References Cited

U.S. PATENT DOCUMENTS

| | | | |
|---|---|---|---|
| 3,089,968 | 5/1963 | Dunn | 307/499 |
| 3,197,626 | 7/1965 | Platzer, Jr. | 364/849 |
| 3,413,456 | 11/1968 | Sutton | 364/843 |
| 3,584,232 | 6/1971 | Wallace, Jr. | 307/492 |
| 3,668,440 | 6/1972 | Davis et al. | 307/310 |
| 4,430,626 | 2/1984 | Adams | 307/492 |
| 4,441,041 | 4/1984 | Schröder | 307/494 |
| 4,453,091 | 6/1984 | Katakura et al. | 328/145 |
| 4,737,668 | 4/1988 | Bletz et al. | 307/492 |

*Primary Examiner*—Stanley D. Miller
*Assistant Examiner*—Richard Roseen
*Attorney, Agent, or Firm*—Fish & Richardson

[57] ABSTRACT

Circuitry and method for generating electrical currents representative of an exponential function of an input current. The circuit includes an input diode chain and an output diode chain. Each of the diodes in the input diode chain has an input current passing therethrough. The input current is produced by an input current source connected in sources with the diode below the cathode of the diode. A voltage driving circuit drives a voltage drop across the output diode chain that has a predetermined relationship to the voltage drop across the input diode chain. The voltage drop across the output diode chain results in a current through the output diode chain. The number of diodes in the output diode chain is preselected relative to the number of diodes in the input diode chain such that the current through the output diode chain is representative of an exponential function of the input current or currents.

33 Claims, 2 Drawing Sheets

EXPONENTIAL FUNCTION CIRCUITRY

BACKGROUND OF THE INVENTION

This invention relates to circuits that generate electrical currents proportional to an exponential function of one or more input currents.

If $I_d$ is the current flowing through a diode, then the voltage across the diode is equal to $V_t \cdot \ln[I_d+I_s)/I_s]$, where $I_s$ is the saturation current of the diode. $V_t=K_BT/q$, where $K_B$ is Boltzmann's constant, T is the temperature, and q is the charge of an electron. Since $I_s$ is typically in the range of $10^{-18}$ to $10^{-16}$ amperes, and $I_d >> I_s$, the voltage across the diode closely approximates $V_t \cdot \ln(I_d/I_s)$. Likewise, the voltage across the base-emitter junction of a transistor closely approximates $V_t \cdot \ln(I_d/I_s)$ where $I_c$ is the current flowing into the collector of the transistor.

FIG. 1 shows a circuit 100 that produces an output current $I_o$ equal to the square root of the product of currents $I_1$ and $I_2$. The saturation current $I_s$ is the same for all of the transistors in the circuit. Current source 102 produces current $I_1$ and current source 104 produces current $I_2$. Current source 102 is connected between a voltage source 106 and the collector of transistor 108. The emitter of transistor 108 is connected to ground. The voltage at the base of transistor 108 is therefore $V_t \cdot \ln(I_1/I_s)$. The base of transistor 108 is connected to the emitter of transistor 110. Current source 104 is connected between the emitter of transistor 110 and ground. The collector of transistor 110 is connected to the voltage source 106. The voltage at the base of transistor 110 is therefore $V_t \cdot \ln(I_1/I_s)+V_t \cdot \ln(I_2/I_s)$. The base of transistor 110 is connected to current source 102 and the base of transistor 112. The emitter of transistor 112 is connected to the collector and base of transistor 114, which functions as a diode. The emitter of transistor 114 is connected to ground. The voltage at the base of transistor 112 is therefore $2V_t \cdot \ln(I_o/I_s)$. Thus, $$\ln(I_1/I_s)+\ln(I_2/I_s)=2\ln(I_o/I_s), \text{ or } I_o=(I_1 \cdot I_2)^{\frac{1}{2}}.$$

Other circuits produce an output voltage equal to the square root of an input voltage. For example an operational amplifier can be connected with a diode in its feedback loop, so that the operational amplifier produces an output proportional to the logarithm of an input voltage. The logarithm output is connected to a voltage divider that produces an output voltage equal to one-half of the input voltage to the voltage divider. The output of the voltage divider is connected to the inverting input of a second operational amplifier through a diode, so that the second amplifier produces an output proportional to the antilogarithm of the output of the voltage divider. Thus, $$\log(V_{out})=\tfrac{1}{2}[\log(V_{in})], \text{ or } V_{out}=V_{in}^{\frac{1}{2}}.$$

In another circuit, an input voltage $V_{in}$ is connected through a resistor to the inverting input of an operational amplifier. The output, $V_{out}$, of the operational amplifier is connected to a multiplier circuit whose output is equal to $-(V_{out})^2$. The output of the multiplier circuit is connected through a resistor to the inverting input of the operational amplifier. $V_{out}$ equals $V_{in}^{\frac{1}{2}}$.

SUMMARY OF THE INVENTION

In one aspect the invention features a circuit that generates an electrical current representative of an exponential function of an input current. The circuit includes an input diode chain and an output diode chain. Each of the diodes in the input diode chain has an input current passing therethrough, creating a voltage drop across the input diode chain. A voltage driving circuit drives a voltage drop across the output diode chain that has a predetermined relationship to the voltage drop across the input diode chain. The voltage drop across the output diode chain results in a current through the output diode chain that is proportional to an exponential function of the input current or currents.

In another aspect, the invention features a circuit for generating electrical currents representative of an exponential function of an electrical input current, in which each diode in an input diode chain is connected in series with an input current source. The input current source or sources are connected below the cathode of the diode. An output diode chain has a voltage drop across itself proportional to the voltage drop across the input diode chain.

In one embodiment of the invention, the input diode chain includes first and second input subchains. A first current source pulls a first input current through the first and second input subchains. A second current source pulls a second input current through the second input subchain only. The first and second subchains of the input diode chain each have a number of diodes equal to one-half the number of diodes in the output diode chain. The current through the output diode chain is equal to the square root of the product of the first input current and the sum of the first and second input currents.

In another embodiment, the first current source pulls the first input current through the first input subchain only. The second current source pulls the second input current through the second input subchain only. The current through the output diode chain is equal to the square root of the product of the first and second input currents.

In preferred embodiments, the voltage driving circuit is a differential amplifier having first and second npn transistors. The differential amplifier is configured to force the voltage at the base of the second transistor equal to the voltage at the base of the first transistor. The base of the first transistor is connected to the cathode of the bottommost diode in the input diode chain. The base of the second transistor is connected to the cathode of the bottommost diode in the output diode chain. The anode of the topmost diode in the input diode chain is connected to the anode of the topmost diode in the output diode chain.

Circuits according to the invention can exhibit a high degree of precision, the precision being enhanced by increasing the number of diodes in the input and output diode chains. Since the input current sources are connected below the cathodes of the diodes through which the input current sources pull the input currents, the input current sources can be npn transistors, rather than more expensive current sources that utilize high-speed pnp transistors or high-speed amplifiers. Because the differential amplifier also consists of npn transistors, circuits according to the invention can exhibit a high-speed response to changes in the input currents. The transistors into which the output currents flow require very little head room. The head room can be as low as 0.2 volts.

Other advantages and features will become apparent from the following detailed description and from the claims when read in connection with the accompanying drawings.

DESCRIPTION OF THE PREFERRED EMBODIMENTS

We first briefly describe the drawings.

Drawings

Structure and Operation

Figure 1:
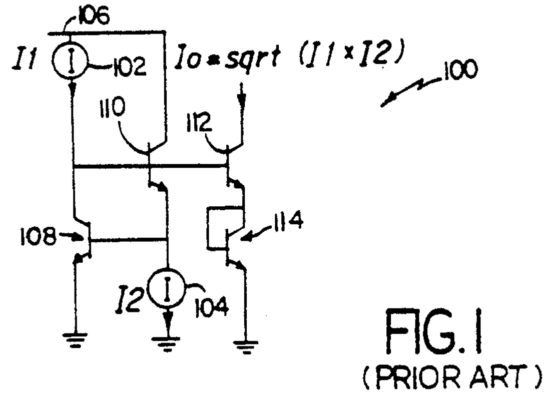
FIG. 1 (PRIOR ART)
FIG. 1 is a circuit diagram of a prior art circuit that produces an output current equal to the square root of the product of two input currents.
Figure 2:
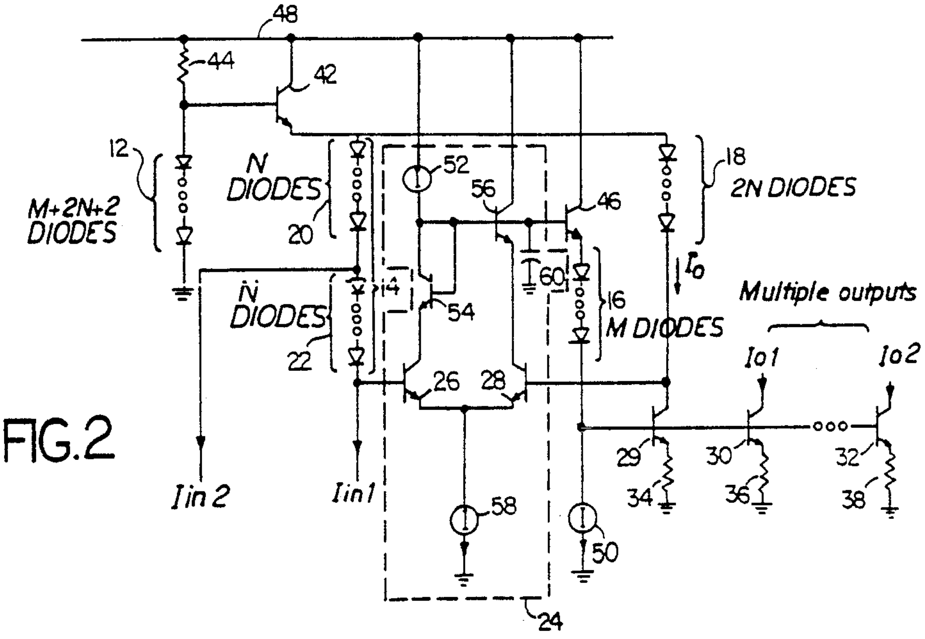
FIG. 2 is a circuit diagram of a circuit according to the invention that produces output currents proportional to the square root of the product of a first input current and the sum of the first input current and a second input current.

FIG. 2 is a circuit diagram of a multiple-output square root circuit according to the invention. The circuit includes an input diode chain 14 and an output diode chain 18. The diodes may be the base-emitter junctions of npn transistors, where the base of each transistor is connected to the transistor's collector. Diode chain 14 consists of two input sub-chains 20 and 22, each having N diodes, where N is any number greater than or equal to 1. Output diode chain 18 has 2N diodes. The voltage at the top of input diode chain 14 equals the voltage at the top of output diode chain 18. A voltage driving circuit in the form of a differential amplifier 24 forces the voltage at the bottom of diode chain 18 equal to the voltage at the bottom of diode chain 14, as explained in greater detail below.

A first input current $I_{in1}$ passes through the entire length of input diode chain 14, while a second input current $I_{in2}$ passes only through input subchain 20. Thus, the current through input subchain 20 is equal to $I_{in1}$ plus $I_{in2}$, and the current through input subchain 22 is equal to $I_{in1}$. The small base current to transistor 26 is negligible compared to the input currents $I_{in1}$ and $I_{in2}$, and can thus be ignored. The current sources that produce currents $I_{in1}$ and $I_{in2}$ can be npn transistors having a resistor connected between the emitter and ground and having a fixed voltage applied to the base.

The voltage across each diode is equal to $V_t \cdot \ln[(I_d + I_s)/I_s]$. $V_t = k_B T/q$, where $k_B$ is Boltzmann's constant, T is the temperature, and q is the charge of an electron. $I_d$ is the current through the diode, and $I_s$ is the saturation current of the diode. $I_s$ for each diode is proportional to the diode area.

Since $I_s$ is typically in the range of $10^{-18}$ to $10^{-16}$ amperes, and $I_d >> I_s$, the voltage across each diode closely approximates $V_t \cdot \ln(I_d/I_s)$. The voltage across diode subchain 20 is therefore $NV_t \cdot \ln[(I_{in1}+I_{in2})/I_{s20}]$, and the voltage across input subchain 22 is $NV_t \cdot \ln(I_{in1}/I_{s22})$, where $I_{s20}$ and $I_{s22}$ are the saturation currents of each of the diodes in diode subchain 20 and each of the diodes in diode subchain 22, respectively. Since the differential amplifier 24 forces the voltage at the bottom of output diode chain 18 equal to the voltage at the bottom of input diode chain 14, a current $I_o$ flows through output diode chain 18 to the collector of transistor 29. The voltage across output diode chain 18 is therefore equal to $2NV_t \cdot \ln(I_o/I_{s18})$, where $I_{s18}$ is the saturation current of each of the diodes in output diode chain 18. The small base current to transistor 28 can be ignored.

Let $V_{os}$ be the offset voltage between the base of transistor 26 and the base of transistor 28 in differential amplifier 24. Since the voltage across input diode chain 14 plus the offset voltage $V_{os}$ of the differential amplifier is equal to the voltage across output diode chain 18, $$NV_t \cdot \ln[(I_{in1}+I_{in2})/I_{s20}] + NV_t \cdot \ln(I_{in1}/I_{s22}) + V_{os} = 2NV_t \cdot \ln(I_o/I_{s18}).$$

Thus, $0.5 \ln\{[(I_{in1}+I_{in2}) \cdot I_{in1}]/(I_{s20} \cdot I_{s22})\} + 0.5 \cdot V_{os}/(NV_t) = \ln(I_o/I_{s18})$. If $V_{os}=0$, then $$I_o/I_{s18} = \{[(I_{in1}+I_{in2}) \cdot I_{in1}]/(I_{s20} \cdot I_{s22})\}^{\frac{1}{2}}.$$

Thus, $I_o = [I_{s18}/(I_{s20} \cdot I_{s22})^{\frac{1}{2}}] \cdot [(I_{in1}+I_{in2}) \cdot I_{in1}]^{\frac{1}{2}}$. If the saturation current is the same for all of the diodes in input subchains 20 and 22 and output diode chain 18, then $I_o = [(I_{in1}+I_{in2}) \cdot I_{in1}]^{\frac{1}{2}}$.

The current $I_o$ flows into the collector of transistor 29. The actual output currents of the square root circuit, $I_{o1}$, and $I_{o2}$, flow into the collectors of transistors 30 and 32, which have their bases connected to the base of transistor 29. Resistors 34, 36, and 38 connect the emitters of transistors 29, 30, and 32, respectively, to ground. If the resistors 34, 36, and 38 all have the same resistance, and if the emitter areas of all three transistors 29, 30, and 32 are the same, then output currents $I_{o1}$, and $I_{o2}$, which enter the collectors of transistors 30 and 32, respectively, will both be equal to the current $I_o$ that enters the collector of transistor 29. By decreasing the resistance of resistor 36 or 38 relative to the resistance of resistor 34, or by using a transistor 30 or 32 having an emitter area greater than the emitter area of transistor 29, output current $I_{o1}$ or $I_{o1}$, respectively, can be made greater than but proportional to $I_o$. Likewise, by increasing the resistance of resistor 36 or 38 relative to the resistance of resistor 34, or by using a transistor 30 or 32 having an emitter area smaller than the emitter area of transistor 29, output current $I_{o1}$ or $I_{o2}$, respectively, can be made less than but proportional to $I_o$. For example, if the resistance of resistor 36 is 1/k times the resistance of resistor 34, and the emitter area of transistor 30 is k times the emitter area of transistor 29, where k is a constant, the output current $I_{o1}$ will be k times $I_o$. Note that if the voltage across resistor 36 or resistor 38 is low enough, the voltage at the collector of transistor 30 or transistor 32 can be as low as 0.2 volts without transistors 30 or 32 becoming saturated. Thus, transistors 30 and 32 provide output current sources that can drive low output voltages.

In addition to input diode chain 14 and output chain 18, the square root circuit includes diode chains 12 and 16. Diode chain 12 is used to provide sufficient head room for the proper operation of the input current sources, as described below. "Head room" as used in this specification and in the claims refers to the voltages above the input current sources as shown in the Figures, e.g., the voltage at the base of transistor 26 and the voltage at the point between input diode subchains 20 and 22 in FIG. 2. Diode chain 16 is used to ensure that transistors 26 and 28 of differential amplifier 24 are not saturated, and to reduce error in the offset voltage $V_{os}$ of differential amplifier 24, as described below.

Diode chain 16 has M diodes, and diode chain 12 has M+2N+2 diodes. The number M can be any number greater than or equal to zero. The value of M determines the voltage at the base of transistor 26 and the voltage at the point between input diode subchains 20 and 22, and hence the value of M determines the amount of head room available for the input current sources.

Current flows from supply voltage 48, through resistor 44, and through the diodes in diode chain 12 to ground. The voltage at the top of diode chain 12 is equal to $(M+2N+2)\cdot V_{be}$, where $V_{be}$ is the voltage across each diode. As explained above, $V_{be}$ varies with the amount of current that passes through each diode, but since $V_{be}$ varies logarithmically with the current, $V_{be}$ can be assumed to be approximately the same for each diode in the circuit for purposes of the analysis to follow. The voltage at the emitter of transistor 42 is equal to $(M+2N+1)V_{be}$, because the Voltage drop across the base emitter junction of transistor 42 is $V_{be}$. The voltage at the base of transistor 26 is $(M+1)V_{be}$, because the voltage across each of the 2N diodes in input diode chain 14 is $V_{be}$. Thus, diode chain 12 sets up a common reference voltage at the top of diode chains 14 and 18, and provides for a voltage at the bottom of input diode chain 14 that leaves sufficient head room for the proper operation of the input current source associated with $I_{in1}$.

Current source 50 causes current to flow from supply voltage 48 through transistor 46 and diode chain 16. The voltage at the base of transistor 46 is equal to $(M+2)V_{be}$ plus the voltage across resistor 34, since the voltage across each diode in diode chain 16 and across the base-emitter junctions of transistors 28 and 46 is $V_{be}$. Since the base of transistor 46 is connected to the bases of transistors 54 and 56, the voltage at the emitter of transistor 54 and the voltage at the emitter of transistor 56 will equal $(M+1)V_{be}$ plus the voltage across resistor 34. Thus, the voltage at the collectors of transistors 26 and 28 will never be less than the voltages at the bases of transistors 26 and 28. (Recall that the differential amplifier 24 forces the voltage at the base of transistor 28 approximately equal to the voltage at the base of transistor 26.) Transistors 26 and 28 therefore will never be saturated. Moreover, since the voltages at the collectors of transistors 26 and 28 are the same, error in the offset voltage $V_{os}$ of differential amplifier 24 is minimized.

Differential amplifier 24 consists of transistors 26, 28, 54, and 56, current sources 52 and 58, and compensation capacitor 60. Current source 52 delivers current from supply voltage 48 through transistor 54 to the collector of transistor 26. Current source 58 produces a current equal to twice the current produced by current source 52, so that a current flows into the collector of transistor 28 that is equal to the current flowing into the collector of transistor 26. Since the current flowing through transistor 26 equals the current flowing through transistor 28, the base-emitter voltage drop of transistor 26 equals the base-emitter voltage drop of transistor 28. Thus, differential amplifier 24 drives the voltage at the base of transistor 28 approximately equal to the voltage at the base of transistor 26. Because the differential amplifier 24 is a closed-loop system subject to possible oscillation effects, a compensation capacitor 60 is used to stabilize the differential amplifier 24.

The accuracy of the square root circuit can be enhanced by increasing the number N of diodes in the input diode subchains 20 and 22. Recall that $NV_r \cdot ln[(I_{in1}+I_{in2})/I_s]+NV_r \cdot ln(I_{in1}/I_s)+V_{os}=2NV_r \cdot ln(I_o/I_s)$, where $V_{os}$ is the offset voltage of differential amplifier 24. If $V_{os}$ is not exactly equal to zero, then the term $V_{os}$ introduces error into the result $I_o=[(I_{in1}+I_{in2})\cdot I_{in1}]^{\frac{1}{2}}$. As N increases, however, the error caused by the term $V_{os}$ is minimized. The maximum number of diodes in diode chains 14 and 18 is limited only by the supply voltage 48. Thus, if N is large enough, the circuit can achieve a high degree of precision. Moreover, since the differential amplifier 24 consists entirely of npn transistors, the square root circuit exhibits a high-speed response to changes in the input currents $I_{in1}$ and $I_{in2}$.

Figure 3:
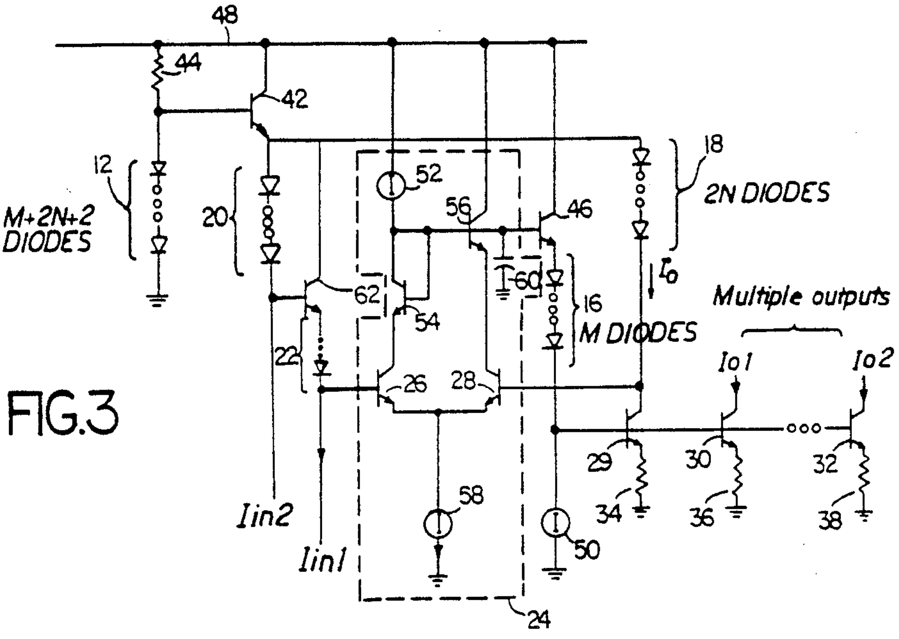
FIG. 3 is a circuit diagram of a circuit according to the invention that produces output currents proportional to the square root of the product of two input currents.

There is shown in FIG. 3 an alternative configuration of input diode chain 14. The bottom of input diode subchain 20 is connected to the base of transistor 62, rather than being connected directly to the top of input diode subchain 22. The top of diode subchain 22 is connected to the emitter of transistor 62. The collector of transistor 62 is connected to the emitter of transistor 42. Ignoring the small base currents to transistors 26 and 62, the current through input subchain 20 is equal to $I_{in1}$, and the current through input subchain 22 is equal to $I_{in2}$. Note that there are N−1 diodes, rather than N diodes, in input diode subchain 22, because the current $I_{in2}$ passes through the base-emitter junction of transistor 62, which functions as one diode voltage drop. With this configuration of diode chain 14, the current $I_o$ through diode chain 18 will equal $(I_{in1}\cdot I_{in2})^{\frac{1}{2}}$.

Figure 4:
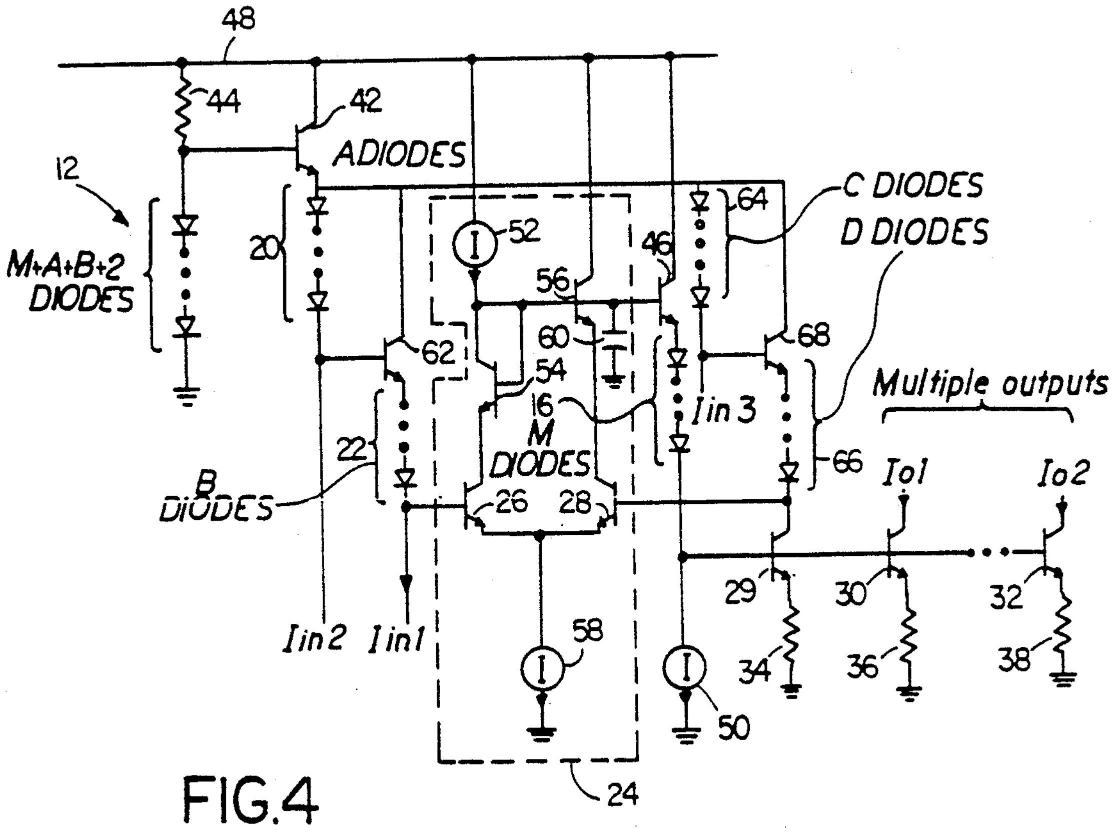
FIG. 4 is a circuit diagram of a circuit according to the invention that produces output currents proportional to an exponential function of a product or a ratio of input currents.

There is shown in FIG. 4 an alternative configuration of output diode chain 18 that results in output currents proportional to exponential functions of products or ratios, where the exponential function need not be a square root function. Output diode chain 18 includes subchain 64 and subchain 66. The top of diode subchain 64 connects with the emitter of transistor 42. The bottom of diode subchain 64 connects with the base of transistor 68. The collector of transistor 68 connects with the emitter of transistor 42, and the base-emitter junction of transistor 68 forms the first diode drop in diode subchain 66. The bottom of subchain 66 connects with the base of transistor 28 of differential amplifier 24.

An input current $I_{in3}$ passes through diode subchain 64. The voltage across each diode in diode subchain 64 is $V_r \cdot ln(I_{in3}/I_{s64})$, where $I_{s64}$ is the saturation current of each of the diodes in subchain 64. Likewise, the voltage across each diode in diode subchain 66 is $V_r \cdot ln(I_o/I_{s66})$, where $I_{s66}$ is the saturation current of each of the diodes in subchain 66. If diode subchain 20 has A diodes, diode subchain 22 has B diodes, diode subchain 64 has C diodes, and diodes subchain 66 has D diodes, then $A\cdot V_r \cdot ln(I_{in2}/I_{s20})+B\cdot V_r \cdot ln(I_{in1}/I_{s22})=C\cdot V_r \cdot ln(I_{in3}/I_{s64})+D\cdot V_r \cdot ln(I_o/I_{s66})$. Thus, $(I_{in2})^A(I_{in1})^B/(I_{s20})^A(I_{s22})^B=(I_{in3})^C(I_o)^D/(I_{s64})^C(I_{s66})^D$. Hence, $I_o=[(I_{s64})^C(I_{s66})^D/(I_{s20})^A(I_{s22})^B]\cdot[(I_{in2})^A(I_{in1})^B/(I_{in3})^C]^{1/D}$. Since the saturation currents are constants, $I_o=k[(I_{in2})^A(I_{in1})^B/(I_{in3})^C]^{1/D}$, where k is a constant. The circuit of FIG. 4 produces a current $I_o$ that is proportional to an exponential function of a product or ratio of input currents. The nature of the exponential function (square root, cube root, etc.) depends on the values of A, B, C, and D. Note that FIG. 3 is a special case of FIG. 4 with $I_{in3}=0$, $C=0$, $2A=2B=D$, and $I_o=k(I_{in1}\cdot I_{in2})^{\frac{1}{2}}$.

Other embodiments are within the following claims.

We claim:

1. A circuit for generating an electrical current representative of an exponential function of an electrical input current, comprising an input diode chain, each of the diodes in said input diode chain having an input current passing therethrough, creating a first voltage drop across said input diode chain, said input current being generated by at least one input current source that drives said input current through said input diode chain, an output diode chain and a voltage driving circuit connected between said input diode chain and said output diode chain, for driving a second voltage drop across said output diode chain, said second voltage drop having a predetermined relationship to said first voltage drop, said second voltage drop resulting in a current through said output diode chain, said current through said output diode chain being representative of an exponential function of said input current generated by said input current source.

2. The circuit of claim 1 wherein each of the diodes in said input diode chain is connected in series with said input current source, said input current source producing said input current that passes through said diode, said input current source pulling said input current through said diode from below a cathode of said diode.

3. The circuit of claim 1 wherein said voltage driving circuit is a differential amplifier having first and second npn transistors, and said differential amplifier is configured to force a voltage at a base of said second transistor equal to a voltage at a base of said first transistor.

4. The circuit of claim 3 wherein the base of said first transistor in said differential amplifier is connected to a cathode of a bottommost diode in said input diode chain, and the base of said second transistor in said differential amplifier is connected to a cathode of a bottommost diode in said output diode chain.

5. The circuit of claim 4 wherein an anode of a topmost diode in said input diode chain is connected to an anode of a topmost diode in said output diode chain.

6. The circuit of claim 3 further comprising circuitry for relating a voltage at a collector of said first transistor in said differential amplifier and a voltage at a collector of said second transistor in said differential amplifier to a voltage at one end of a third diode chain, each diode in said third diode chain having a diode voltage drop across itself, the number of diodes in said third diode chain being preselected such that the voltage at the collector of said first transistor in said differential amplifier and the voltage at the collector of said second transistor in said differential amplifier are high enough that said first transistor and said second transistor are not saturated.

7. The circuit of claim 1 wherein the number of diodes in said input diode chain and the number of diodes in said output diode chain are preselected so as to sufficiently minimize error due to an offset voltage of said voltage driving circuit.

8. A circuit for generating an electrical current representative of an exponential function of an electrical input current comprising an input diode chain having a first voltage drop across itself, each of the diodes in said input diode chain having an input current passing therethrough, said input current being produced by an input current source connected in series with a diode of said input diode chain below a cathode of said diode, and an output diode chain having a second voltage drop across itself in a predetermined relationship to said first voltage drop, said second voltage drop resulting in a current through said output diode chain, a voltage driving circuit connected between said input diode chain and said output diode chain, said current through said output diode chain being representative of an exponential function of said input current.

9. The circuit of claim 2 or 8 further comprising voltage reference circuitry for ensuring that a voltage at the cathode of each diode in said input diode chain is high enough to provide sufficient head room for said input current source that pulls said input current through said diode from below the cathode of said diode.

10. The circuit of claim 9 wherein said voltage reference circuitry comprises a fourth diode chain, the voltage across each diode in said fourth diode chain and each diode in said input diode chain is equal to a diode voltage drop, one end of said fourth diode chain is connected to a first reference voltage, the number of diodes in said fourth diode chain is preselected to provide a second reference voltage at an anode of a topmost diode in said input diode chain, and said second reference voltage is high enough to ensure sufficient head room for said input current source.

11. The circuit of claim 1 or 8 further comprising a plurality of transistors, each transistor having a base that is connected to the base of each of the other transistors, a first of said plurality of transistors having a collector that is connected to said output diode chain so that said current passing through said output diode chain passes through said first transistor, each transistor other than said first transistor having a collector into which an output current flows, said output current being proportional to said current passing through said output diode chain.

12. The circuit of claim 1 or 8 wherein said input diode chain comprises first and second input subchains, a first input current source drives a first input current through said first and second subchains, a second input current source drives a second input current through said second subchain only, and said first and second input subchains of said input diode chain each have a number of diodes equal to one-half of the number of diodes in said output diode chain, so that said current through said output diode chain is equal to the square root of the product of said first input current and the sum of said first and second input currents.

13. The circuit of claim 1 or 8 wherein said input diode chain comprises first and second input subchains, a first input current source drives a first input current through said first subchain only, a second input current source drives a second input current through said second subchain only, and said first and second input subchains of said input diode chain each have a number of diodes equal to one-half the number of diodes in said output diode chain, so that said current through said output diode chain is equal to the square root of the product of said first and second input currents.

14. The circuit of claim 1 or 8 wherein said output diode chain comprises first and second subchains, said first subchain has a current passing therethrough, said current through said first subchain resulting in a voltage across said first subchain, said second subchain has an output voltage across itself that has a predetermined relationship to said voltage across said first subchain, said output voltage resulting in an output current through said second subchain, and said first and second subchains each have a number of diodes that is preselected relative to a number of diodes in said input diode chain to enable said output current through said second subchain to be representative of a predetermined exponential function of said input current passing through said input diode chain and said current passing through said first subchain of said output diode chain.

15. A circuit for generating an electrical current representative of an exponential function of a plurality of input currents, comprising an input diode chain, having a first end and a second end, comprising a plurality of subchains having equal numbers of diodes, each subchain having an electrical input current passing therethrough, said electrical input current being produced by an input current source connected in series with said subchain below the cathodes of the diodes in said subchain, an output diode chain, having a first end and a second end, and having a number of diodes equal to a number of diodes in said input diode chain, configured such that a voltage at said first end of said output diode chain equals a voltage at said first end of said input diode chain, and voltage driving circuitry for driving a voltage at said second end of said output diode chain equal to a voltage at said second end of said input diode chain, creating a voltage drop across said output diode chain that results in a current passing through said output diode chain, said current through said output diode chain being equal to a square root of a function of said input currents passing through said subchains of said input diode chain.

16. A circuit for generating an electrical current representative of a square root of a function of two input currents, comprising an input diode chain comprising first and second input subchains having equal numbers of diodes, said first input subchain having at least a first electrical input current passing therethrough, said second input subchain having at least a second electrical input current passing therethrough, said first input current being produced by a first input current source connected in series with said first input subchain below the cathodes of the diodes in said first input subchain, said second input current being produced by a second input current source connected in series with said second input subchain below the cathodes of the diodes in said second input subchain, an output diode chain having twice the number of diodes in each of said first and second input subchains, configured such that a voltage at a first end of said output diode chain equals a voltage at a first end of said input diode chain, and a differential amplifier circuit for driving a voltage at a second end of said output diode chain equal to a voltage at a second end of said input diode chain, creating a voltage drop across said output diode chain that results in a current passing through said output diode chain, said current through said output diode chain being equal to a square root of a function of said first and second input currents.

17. A method of generating an electrical current representative of an exponential function of an electrical input current, comprising the steps of passing an input current through each diode in an input diode chain, so that a first voltage drop is created across said input diode chain, said input current being generated by at least one input current source that drives said input current through said input diode chain, and driving a second voltage drop across an output diode chain, said second voltage drop having a predetermined relationship to said first voltage drop, said second voltage drop resulting in an electrical current through said output diode chain, said current through said output diode chain being representative of an exponential function of said input current generated by said input current source.

18. The method of claim 17 wherein said step of passing said input current through each diode in said input diode chain comprises connecting each diode in said input diode chain with said input current source, said input current source producing said input current that passes through said diode, said input current source pulling said input current through said diode from below a cathode of said diode.

19. The method of claim 17 wherein said step of driving said second voltage drop across said output diode chain comprises forcing a voltage at a base of a second transistor in a differential amplifier equal to a voltage at a base of a first transistor in said differential amplifier.

20. A circuit for generating an electrical current representative of an exponential function of an electrical input current, comprising an input diode chain, each of the diodes in said input diode chain having an input current passing therethrough, creating a first voltage drop across said input diode chain, an output diode chain, and a voltage driving circuit connected between said input diode chain and said output diode chain, for driving a second voltage drop across said output diode chain, said second voltage drop having a predetermined relationship to said first voltage drop, said second voltage drop resulting in a current through said output diode chain, said current through said output diode chain being representative of an exponential function of said input current, one of the diodes in said input diode chain being connected in series with an input current source, said input current source producing said input current that passes through said one diode, said input current source pulling said input current through said one diode from below a cathode of said one diode.

21. The circuit of claim 20 wherein said voltage driving circuit is a differential amplifier having first and second npn transistors, and said differential amplifier is configured to force a voltage at a base of said second transistor equal to a voltage at a base of said first transistor.

22. The circuit of claim 21 wherein the base of said first transistor in said differential amplifier is connected to a cathode of a bottommost diode in said input diode chain, and the base of said second transistor in said differential amplifier is connected to a cathode of a bottommost diode in said output diode chain.

23. The circuit of claim 22 wherein an anode of a topmost diode in said input diode chain is connected to an anode of a topmost diode in said output diode chain.

24. The circuit of claim 21 further comprising circuitry for relating a voltage at a collector of said first transistor in said differential amplifier and a voltage at a collector of said second transistor in said differential amplifier to a voltage at one end of a third diode chain, each diode in said third diode chain having a diode voltage drop across itself, the number of diodes in said third diode chain being preselected such that the voltage at the collector of said first transistor in said differential amplifier and the voltage at the collector of said second transistor in said differential amplifier are high enough that said first transistor and said second transistor are not saturated.

25. The circuit of claim 20 wherein the number of diodes in said input diode chain and the number of diodes in said output diode chain are preselected so as to sufficiently minimize error due to an offset voltage of said voltage driving circuit.

26. The circuit of claim 20 further comprising voltage reference circuitry for ensuring that a voltage at the cathode of each diode in said input diode chain is high enough to provide sufficient head room for said input current source that pulls said input current through said diode from below the cathode of said diode.

27. The circuit of claim 26 wherein said voltage reference circuitry comprises a fourth diode chain, the voltage across each diode in said fourth diode chain and each diode in said input diode chain is equal to a diode voltage drop, one end of said fourth diode chain is connected to a first reference voltage, the number of diodes in said fourth diode chain is preselected to provide a second reference voltage at an anode of a topmost diode in said input diode chain, and said second reference voltage is high enough to ensure sufficient head room for said input current source.

28. A circuit for generating an electrical current representative of an exponential function of an electrical input current, comprising an input diode chain, each of the diodes in said input diode chain having an input current passing therethrough, creating a first voltage drop across said input diode chain, an output diode chain, and a voltage driving circuit connected between said input diode chain and said output diode chain, for driving a second voltage drop across said output diode chain, said second voltage drop having a predetermined relationship to said first voltage drop, said second voltage drop resulting in a current through said output diode chain, said current through said output diode chain being representative of an exponential function of said input current, further comprising a plurality of transistors, each transistor having a base that is connected to the base of each of the other transistors, a first of said plurality of transistors having a collector that is connected to said output diode chain so that said current passing through said output diode chain passes through said first transistor, each transistor other than said first transistor having a collector into which an output current flows, said output current being proportional to said current passing through said output diode chain.

29. A circuit for generating an electrical current representative of an exponential function of an electrical input current, comprising an input diode chain, each of the diodes in said input diode chain having an input current passing therethrough, creating a first voltage drop across said input diode chain, an output diode chain, and a voltage driving circuit connected between said input diode chain and said output diode chain, for driving a second voltage drop across said output diode chain, said second voltage drop having a predetermined relationship to said first voltage drop, said second voltage drop resulting in a current through said output diode chain, said current through said output diode chain being representative of an exponential function of said input current, wherein said input diode chain comprises first and second input subchains, a first input current source drives a first input current through said first and second subchains, a second input current source drives a second input current through said second subchain only, and said first and second input subchains of said input diode chain each have a number of diodes equal to one-half of the umber of diodes in said output diode chain, so that said current through said output diode chain is equal to the square root of the product of said first input current and the sum of said first and second input currents.

30. A circuit for generating an electrical current representative of an exponential function of an electrical input current, comprising an input diode chain, each of the diodes in said input diode chain having an input current passing therethrough, creating a first voltage drop across said input diode chain, an output diode chain, and a voltage driving circuit connected between said input diode chain and said output diode chain, for driving a second voltage drop across said output diode chain, said second voltage drop having a predetermined relationship to said first voltage drop, said second voltage drop resulting in a current through said output diode chain, said current through said output diode chain being representative of an exponential function of said input current, wherein said input diode chain comprises first and second input subchains, a first input current source drives a first input current through said first subchain only, a second input current source drives a second input current through said second subchain only, and said first and second input subchains of said input diode chain each have a number of diodes equal to one-half the number of diodes in said output diode chain, so that said current through said output diode chain is equal to the square root of the product of said first and second input currents.

31. A circuit for generating an electrical current representative of an exponential function of an electrical input current, comprising an input diode chain, each of the diodes in said input diode chain having an input current passing therethrough, creating a first voltage drop across said input diode chain, an output diode chain, and a voltage driving circuit connected between said input diode chain and said output diode chain, for driving a second voltage drop across said output diode chain, said second voltage drop having a predetermined relationship to said first voltage drop, said second voltage drop resulting in a current through said output diode chain, said current through said output diode chain being representative of an exponential function of said input current, wherein said input diode chain comprises first and second subchains, said first subchain has a current passing therethrough, said current through said first subchain resulting in a voltage across aid first subchain, said second subchain has an output voltage across itself that has a predetermined relationship to said voltage across said first subchain, said output voltage resulting in an output current through said second subchain, and said first and second subchains each have a number of diodes that is preselected relative to a number of diodes in said input diode chain to enable said output current through said second subchain to be representative of a predetermined exponential function of said input current.

32. A method of generating an electrical current representative of an exponential function of an electrical input current, comprising the steps of passing an input current through each diode in an input diode chain, so that a first voltage drop is created across said input diode chain, and driving a second voltage drop across an output diode chain, said second voltage drop having a predetermined relationship to said first voltage drop, said second voltage drop resulting in an electrical current through said output diode chain, said current through said output diode chain being representative of an exponential function of said input current, said step of passing said input current through each diode in said input diode chain, an input current source producing said input current that passes through said diode, said input current source pulling said input current through said diode from below a cathode of said diode.

33. A method of generating an electrical current representative of an exponential function of an electrical input current, comprising the steps of passing an input current through each diode in an input diode chain, so that a first voltage drop is created across said input diode chain, and driving a second voltage drop across an output diode chain, said second voltage drop having a predetermined relationship to said first voltage drop, said second voltage drop resulting in an electrical current through said output diode chain, said current through said output diode chain being representative of an exponential function of said input current, said step of driving said second voltage drop across said output diode chain comprising forcing a voltage at a base of a second transistor in a differential amplifier equal to a voltage at a base of a first transistor in said differential amplifier.

* * * * *

UNITED STATES PATENT AND TRADEMARK OFFICE

CERTIFICATE OF CORRECTION

PATENT NO. : 5,065,053

DATED : November 12, 1991

INVENTOR(S) : Chan et al.

It is certified that error appears in the above-identified patent and that said Letters Patent is hereby corrected as shown below:

Col. 4, line 45, "$I_{01}$," (second occurrence) should be --$I_{02}$,-- ;

Col. 5, line 24, "Voltage" should be --voltage--;

Col. 12, line 48, "umber" should be --number--;

Col. 13, line 37, "aid" should be --said-- .

Signed and Sealed this

Fourth Day of May, 1993

Attest:

Michael K. Kirk

MICHAEL K. KIRK

*Attesting Officer*

*Acting Commissioner of Patents and Trademarks*